United States Patent
Byun et al.

(10) Patent No.: US 9,642,082 B2
(45) Date of Patent: May 2, 2017

(54) METHOD BY WHICH BASE STATION TRANSMITS COVERAGE COMPENSATION REQUEST MESSAGE TO DETERMINE SWITCHING TO DORMANT STATE IN WIRELESS COMMUNICATION SYSTEM AND DEVICE FOR SAME

(71) Applicant: LG ELECTRONICS INC., Seoul (KR)

(72) Inventors: Daewook Byun, Seoul (KR); Insun Lee, Seoul (KR); Jian Xu, Seoul (KR); Kyungmin Park, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/906,784

(22) PCT Filed: Jul. 23, 2014

(86) PCT No.: PCT/KR2014/006683
§ 371 (c)(1),
(2) Date: Jan. 21, 2016

(87) PCT Pub. No.: WO2015/012584
PCT Pub. Date: Jan. 29, 2015

(65) Prior Publication Data
US 2016/0174149 A1 Jun. 16, 2016

Related U.S. Application Data

(60) Provisional application No. 61/857,665, filed on Jul. 23, 2013, provisional application No. 61/859,731, filed on Jul. 29, 2013.

(51) Int. Cl.
*H04M 3/00* (2006.01)
*H04W 52/02* (2009.01)
(Continued)

(52) U.S. Cl.
CPC ....... *H04W 52/0206* (2013.01); *H04W 16/24* (2013.01); *H04W 36/22* (2013.01); *H04W 76/046* (2013.01); *H04W 92/20* (2013.01)

(58) Field of Classification Search
None
See application file for complete search history.

(56) References Cited

U.S. PATENT DOCUMENTS

2011/0170466 A1* 7/2011 Kwun ............... H04W 52/0235
370/311
2013/0150044 A1 6/2013 Zhang et al.
(Continued)

FOREIGN PATENT DOCUMENTS

KR 10-2011-0081661 A 7/2011
KR 10-2011-0108885 A 10/2011
KR 10-2011-0136424 A 12/2011

*Primary Examiner* — Erika Washington
(74) *Attorney, Agent, or Firm* — Dentons US LLP

(57) ABSTRACT

The present invention relates to a method of a base station transmitting a coverage compensation request signal to determine switching to an idle state. The method comprising: transmitting, by the first base station, an idle switching request message for requesting switching to the idle state to a second base station in a compensation group to which the first base station belongs; transmitting a Coverage Compensation Request Message to a compensation base station pre-linked to the first base station in the compensation group; receiving a Coverage Compensation Response Message and an idle state switching response message from the compensation base station and the second base station, respectively; determining whether the first base station and the second base station in the compensation group are to switch to the idle state based on the received Coverage Compensation Request Message and the idle state switching response message.

11 Claims, 8 Drawing Sheets

(51) Int. Cl.
  *H04W 16/24* (2009.01)
  *H04W 36/22* (2009.01)
  *H04W 76/04* (2009.01)
  *H04W 92/20* (2009.01)

(56) References Cited

U.S. PATENT DOCUMENTS

2013/0157677 A1   6/2013  Liao et al.
2014/0073311 A1*  3/2014  Xu .................... H04W 52/0206
                                                     455/418

* cited by examiner

☐ Compensation Cell
☒ Energy Saving Cell
☐ Dormant cell

☐ Compensation Cell
☒ Energy Saving Cell
☐ Dormant cell

METHOD BY WHICH BASE STATION TRANSMITS COVERAGE COMPENSATION REQUEST MESSAGE TO DETERMINE SWITCHING TO DORMANT STATE IN WIRELESS COMMUNICATION SYSTEM AND DEVICE FOR SAME

This application is a National Stage Application of International Application No. PCT/KR2014/006683, filed on Jul. 23, 2014, which claims the benefit of U.S. Provisional Application No. 61/857,665, filed on Jul. 23, 2013; and U.S. Provisional Application No. 61/859,731, filed on Jul. 29, 2013, all of which are hereby incorporated by reference in their entirety for all purposes as if fully set forth herein.

FIELD OF THE INVENTION

The present invention relates to a method by which a base station transmits a coverage compensation request signal to determine switching to a dormant state (Idle state) in a wireless communication system and a device for the same.

BACKGROUND ART

Generally, a wireless communication system, which is configured by including a Base Station (BS) and a User Equipment (UE) extensively (or broadly) provides diverse types of communication services including audio or video, and so on, to user devices through one base station or more than one base station, and, generally, one base station may provide one or more cells.

The structure of a recent wireless communication system is changing from a macro cell based centralized base station format, which corresponds to a related art vertical hierarchy, to a base station format, wherein diverse forms of small cells, such as pico cell, femto cell, and so on, are interconnected to a macro cell.

Meanwhile, recently, in accordance with the gradual increase in efforts for reducing greenhouse effect, which is caused by excessive discharge of carbon dioxide, and environmental destruction, the power of base stations is being considered as the factor discharging the largest amount of carbon dioxide even in the field of mobile communication, and how much the power of base stations can be reduced or how efficiently the power of the base station is to be used has become an important issue.

Up to recently, in order to increase the mobility of the user equipment, more focus is maintained on efficiently using the power of the user equipment and reducing energy consumption. However, from now on, by efficiently using the power of the user equipment, not only can the discharge of carbon dioxide be reduced by decreasing the consumption of energy, but Operation Expenditure (OPEX) may also be saved.

Therefore, the need for technology development for reducing power consumption of base stations through efficient energy consumption of base stations is growing, and, in 3GPP (3rd Generation Partnership Project), discussions of an energy saving solution in the view point of base stations have started since Release 9, and, currently, in Release 12, discussions are being made on the technologies for energy saving between LTE (Long Term Evolution) base stations during off-peak time.

For energy saving of the base station, it may be considered to shift the base station to a Power Off or Idle state. In this case, the base station that is shifted to the Power Off or Idle state may perform handover on User Equipments existing in its Coverage area to neighboring base stations, which are capable of compensating for the coverage of the corresponding base station.

However, even though part of the coverage areas may overlap between the base station and the neighboring base station, each of the base stations does not fully cover the other's coverage area, since there are no separate signaling procedures between the base station and the neighboring base station, in case the base station shifts to the Power Off or Idle state, a situation where the base station cannot properly compensate for the coverage of the base station may occur, thereby causing the handover to fail. Furthermore, even if the handover is realized, in the standing point of the neighboring base station, the user equipments may correspond to user equipments existing in the coverage boundary, which may lead to a problem of significant degradation in the Quality of Service being provided to the user equipments.

Accordingly, the introduction of a method of allowing the neighboring base station to compensate for all of the coverage of the base station without any lacking parts and a method of allowing the quality of services being provided to the user equipments to be maintained during the handover is required, and a solution (or scheme) for resolving this is required.

DETAILED DESCRIPTION OF THE INVENTION

Technical Objects

The present invention has been proposed to resolve the above-described requirements of the related art, and an object of the present invention is to propose a method by which a base station transmits a coverage compensation request signal to determine switching to a dormant state (Idle state) in a wireless communication system.

Another object of the present invention is to propose a method allowing a neighboring base station to compensate for all of the coverage of a base station that wishes to shift to an Idle state.

Yet another object of the present invention is to propose a method of allowing the base station that wishes to shift to the Idle state to perform Triggering of a shift to the Idle state, a method of deciding the shift to the Idle state, and a method of indicating the shift to the Idle state.

Yet another object of the present invention is to propose a method of allowing a user equipment to stably receive a service, even if the base station that wishes to shift to the Idle state has shifted to the Idle state.

Yet another object of the present invention is to provide a device supporting the above-described methods.

The technical objects of the present invention will not be limited only to the technical objects described above, and any other additional technical objects that have not been mentioned in the description will become apparent to those having ordinary skills in the art upon the following description of the present application.

Technical Solutions

To solve the aforementioned technical problem, according to one embodiment of the present invention, a method of a first base station transmitting a Coverage Compensation Request Message to determine switching to a idle state in a wireless communication system, the method comprising: transmitting, by the first base station, an idle state switching request message for requesting switching to the idle state to a second base station in a compensation group to which the first base station belongs, transmitting, by the first base station, a Coverage Compensation Request Message to a compensation base station pre-linked to the first base station in the compensation group, receiving, by the first base station, a Coverage Compensation Response Message and an idle state switching response message from the compensation base station and the second base station, respectively, determining whether the first base station and the second base station in the compensation group are to switch to the idle state based on the received Coverage Compensation Request Message and the idle state switching response message, and wherein an idle state switching indication message indicating switching to the idle state is transmitted to the second base station by the first base station based on the determination on whether or not to switch to the idle state.

To solve the aforementioned technical problem, the compensation group is configured by including one or more Saving base stations capable of being switched to the idle state and one or more compensation base stations capable of compensating for a coverage of the saving base station, and wherein each of the one or more compensation base stations is respectively pre-linked to the one or more saving base stations within the Compensation Group in order to perform coverage compensation.

To solve the aforementioned technical problem, the first base station is capable of triggering idle state switching respective to the one or more saving base stations within the compensation group, deciding to perform the idle state switching, and indicating the idle state switching.

To solve the aforementioned technical problem, the Coverage Compensation Request Message includes Load information of the first base station, Coverage information of the first base station, and information notifying that the first base station is capable of being switched to the Idle state.

To solve the aforementioned technical problem, the Idle State Switching Request Message and the Coverage Compensation Request Message are transmitted when load of the first base station is maintained equal to or below predetermined threshold value for a predetermined period of time.

To solve the aforementioned technical problem, the Coverage Compensation Response Message includes a result of whether to decide the coverage compensation of the first station, wherein the result of whether to decide the coverage compensation of the first station is decided based upon whether or not the coverage of the compensation base station is capable of compensating for the coverage of the first base station.

To solve the aforementioned technical problem, the second base station transmits a Coverage Compensation Request Message to the compensation base station linked to the second base station within the compensation group based on the Idle state switching request message, and wherein the Idle State Switching Request Message includes information of coverage compensation in a Coverage Compensation Response Message received by the second base station from the compensation base station linked to the second base station as a response to the Coverage Compensation Request Message.

To solve the aforementioned technical problem, whether to perform idle state switching is determined when the compensation base stations linked to each of the first base station and the second base station within the compensation group are capable of compensating for the coverage of the first base station and the second base station.

To solve the aforementioned technical problem, in case of deciding the Idle state switching, the first base station transmits a Handover Request Message to the compensation base station, wherein the Handover Request Message requests a handover of a user equipment connected to the first base station in the coverage of the first base station to the compensation base station, and wherein the Handover Request Message includes a Quality of Service guarantee request Indication or Cause value requesting the compensation base station to identically guarantee the Quality of Service (QoS) provided from the compensation base station.

To solve the aforementioned technical problem, the Quality of Service guarantee request Indication or Cause Value includes a request for continuing to maintain usage of a specific Bearer used by the user equipment.

To solve the aforementioned technical problem, the first base station stops performing the handover procedure to the compensation base station and switching of the Idle state when a Handover Response Message including a response notifying that the usage of the specific Bearer is maintained is received from the compensation base station.

To solve the aforementioned technical problem, a device transmitting a Coverage Compensation Request Message to determine switching to a idle state in a wireless communication system, the device comprises: a RF Unit (Radio Frequency Unit) including a transmitter and a receiver; and a processor is connected to the transmitter and the receiver and supports communication of the device, wherein the processor is configured to: transmit an idle state switching request message for requesting switching to the idle state to a second base station in a compensation group to which the device belongs, transmit a Coverage Compensation Request Message to a compensation base station pre-linked to the device in the compensation group, receive a Coverage Compensation Response Message and an idle state switching response message from the compensation base station and the second base station, respectively, determine whether the device and the second base station in the compensation group are to switch to the idle state based on the received Coverage Compensation Request Message and idle state switching response message, and wherein an idle state switching indication message indicating switching to the idle state is transmitted to the second base station by the first base station based on the determination on whether or not to switch to the idle state.

Effects of the Invention

According to the present invention, a base station may transmit a coverage compensation request signal to determine switching to a dormant state (Idle state) in a wireless communication system.

Additionally, according to the present invention, the coverage of a base station that wishes to shift to an idle state may be fully (or completely) compensated by a neighboring base station.

Additionally, according to the present invention, the base station that wishes to shift to an Idle state may perform Triggering of a shift to the Idle state decide the shift to the Idle state, and indicate the shift to the Idle state.

Additionally, according to the present invention, a user equipment may stably receive a service, even if the base station that wishes to shift to the Idle state has shifted to the Idle state.

The effects that may be gained from the exemplary embodiment of the present invention will not be limited only to the effects described above, and, other effects of the present application, which are not mentioned herein, will become apparent to those having ordinary skills in the art from the following description of the exemplary embodiments of the present invention. More specifically, effects according to the carrying out of the present invention, which were not intended, may also be derived from the exemplary embodiments of the present invention by anyone with general knowledge and skills in the technical field of the present invention.

BRIEF DESCRIPTION OF THE DRAWINGS

The accompanying drawings are merely provided to facilitate the understanding of the present invention and provide the exemplary embodiments of the present invention along with the detailed description of the present invention. However, the technical characteristics of the present invention will not be limited only to specific drawings, and the characteristics disclosed in each drawing may be newly combined with one another to configure a new exemplary embodiment. The reference numerals of each drawing shall signify the structural elements.

MODE FOR CARRYING OUT THE PRESENT INVENTION

Figure 1:
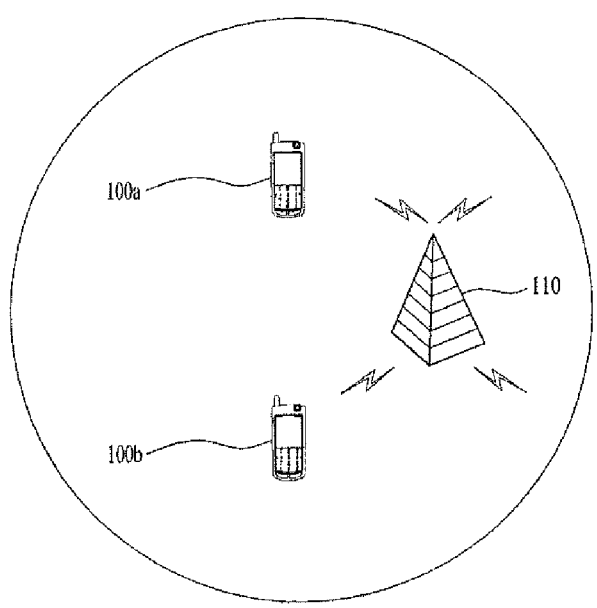
FIG. 1 illustrates an example of a general radio (or wireless) access network system to which the present invention can be applied.

Hereinafter, the preferred embodiments of the present invention will now be described in detail with reference to the accompanying drawings. The detailed description of the present invention that is to be disclosed along with the appended drawings is merely given to provide to describe the exemplary embodiment of the present invention. In other words, the embodiments presented in this specification do not correspond to the only embodiments that can be realized according to the present invention. Additionally, in some cases, in order to avoid any ambiguity in the concept (or idea) of the present invention, some of the structures and devices disclosed (or mentioned) in the present invention may be omitted from the accompanying drawings of the present invention, or the present invention may be illustrated in the form of a block view focusing only on the essential features or functions of each structure and device.

In the following description of the present invention, the description of detailed features of the present invention will be given in order to provide full and complete understanding of the present invention. However, it will be apparent to those skilled in the art that the present invention can be realized even without the detailed features described herein.

In the entire specification, when a part is said to be "comprising (or including)" an element, unless specifically mentioned otherwise, instead of excluding other elements, this signifies that other elements are further included.

Additionally, the term " . . . part (or unit)" mentioned in the specification signifies a unit processing at least one function or operation, and, this may be realized in the form of hardware or software or a combination of both hardware and software. Furthermore, unless differently indicated within the context for describing the present invention, or unless specifically refuted by the context, "a (or an)", "one", and other similar terms may be used as a meaning including both singular and plural forms.

Moreover, the specific terms used in the exemplary embodiments of the present invention are provided to facilitate the understanding of the present invention, and, therefore, unless defined differently, all of the terms used herein, including technical or scientific terms, shall have the same meaning as the terms generally understood by anyone having general skill and knowledge in the technical field to which the present invention belongs. The use of such specific terms may be modified in other forms without departing from the technical scope and spirit of the present invention.

In the entire specification, terms such as first, second, and so on, used in the specification of the present invention may be used to described diverse elements of the present invention. However, the elements of the present invention should not be limited by the terms used in the specification of the present invention. In other words, such terms will be used only to differentiate one element from other elements. For example, without departing from the scope and spirit of the present invention, a first element may be referred to as a second element, and, similarly, a second element may also be referred to as a first element.

Hereinafter, the preferred embodiments of the present invention will now be described in detail with reference to the accompanying drawings. The detailed description of the present invention that is to be disclosed along with the appended drawings is merely given to provide to describe the exemplary embodiment of the present invention. In other words, the embodiments presented in this specification do not correspond to the only embodiments that can be realized according to the present invention.

FIG. 1 is a diagram for an example of a general wireless communication system to which the present invention is applicable.

Referring to FIG. 1, a general wireless communication system to which the present invention is applicable may include a base station (BS) 110 and one or more user equipments (UEs) 100*a* and 100*b*.

In the present invention, the base station 110 may be meaningful as a terminal node of a network which directly performs communication with the user equipment 100*a* and 100*b*. Moreover, in the present invention, a specific operation explained as performed by the base station 110 may be performed by an upper node of the base station in some cases.

In particular, in a network constructed with a plurality of network nodes including the base station 110, it is apparent that various operations performed for communication with the user equipment can be performed by the base station or other network nodes except the base station.

In the present invention, 'base station 110' may be substituted with such a terminology as a fixed station, a Node B, an eNode B (eNB), an access point (AP) and the like.

And, 'user equipment 100*a* and 100*b*' may be substituted with such a terminology as a user device, a terminal, a mobile station (MS), a mobile subscriber station (MSS), a subscriber station (SS), an advanced mobile station (AMS), a wireless terminal (WT), a machine-type communication (MTC) device, a machine-to-machine (M2M) device, a device-to-device (D2D) device and the like.

The embodiments of the present invention may be implemented based on at least one of wireless access systems including IEEE system, 3GPP system, 3GPP LTE system, LTE-A (LTE-Advanced) system, and 3GPP2 system. And, at least one of them may be supported by the disclosed standard documents.

Figure 2:
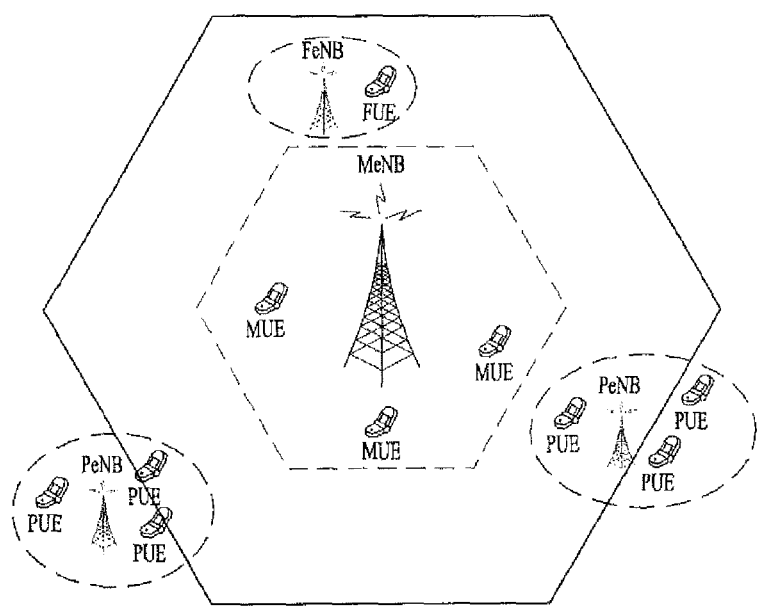
FIG. 2 illustrates a heterogeneous network environment to which the present invention can be applied.

FIG. 2 illustrates a heterogeneous network environment to which the present invention can be applied.

When considering whether or not system performance is enhanced, since additional installation of a macro cell base station is inefficient in the aspects of cost and level of complexity, in a next generation wireless communication system, in order to more stably ensure (or guarantee) data services, such as multimedia, and so on, interest in hierarchical cell structures, wherein small cells (e.g., pico cells or femto cells) for low power/short-range communication co-exist in a macro cell based homogeneous network, or heterogeneous cell structures is increasing.

Meanwhile, the structure of a heterogeneous network that is being considered in the wireless communication system may be configured to have the structure shown in FIG. 2. Multiple small cells co-exist in one macro cell, and each small cell base station is allocated with resources in accordance with a cell coordination method and then provides service to user equipments.

A Coverage, which corresponds to an area that can provide service to user equipments, exists for each of the small cells, and the coverage of a specific small cell can be compensated by the coverage of another neighboring small cell.

Figure 3:
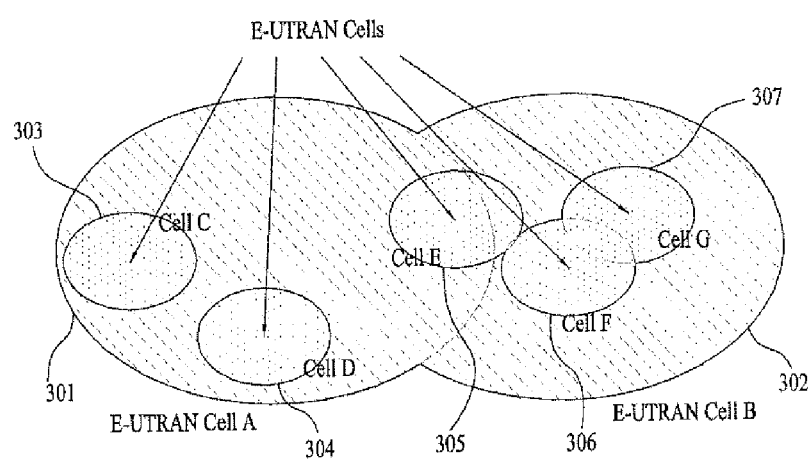
FIG. 3 illustrates an example of switching to an idle state of a base station to which the present can be applied.

FIG. 3 illustrates an example of switching to an idle state of a base station to which the present can be applied.

Referring to FIG. 3, cells or base stations of an E-UTRAN (Evolved Terrestrial Radio Access Network) providing basic coverage are illustrated.

Herein, E-UTRAN refers to a system that has evolved from a legacy UTRAN system, and the E-UTRAN is configured of base stations, and the base stations may be connected to one another through a X2 interface.

Meanwhile, in FIG. 3, Cell A and Cell B are LTE (Long Term Evolution) base stations of E-UTRAN providing basic coverage (301, 302), and Cell C to Cell G are LTE base stations of E-UTRAN used for the purpose of Capacity Boosting.

Most particularly, Cell C and Cell D are used for the purpose of capacity boosting of Cell A, and Cell F and Cell G are used for the purpose of capacity boosting of Cell B, and Cell E corresponds to a LTE base station that is used for the purpose of capacity boosting of both Cell A and Cell B.

Meanwhile, in case Cell A or Cell B does not require any additional capacity boosting, Cell C to Cell G may be switched to an Idle state (or a Switching Off mode), and, in case Cell A or Cell B requires additional capacity boosting, Cell C to Cell G may be switched back to an Active state (or a Switching On mode).

Meanwhile, before 3GPP (3rd Generation Partnership Project) Release 12, in case a Cell Load of a LTE base station is equal to or less than a pre-determined Threshold Value and is maintained for a predetermined period of time or more, the LTE base station, this indicates that switching to the Idle state may be decided. In this case, if a user equipment (or user equipments) being provided with services exists (or exist), the base station performs handover of the user equipment(s) to a LTE base station providing basic coverage (e.g., Cell A or Cell B of FIG. 3), and, then, switches to the Idle state after transmitting a message (Deactivation Message or Deactivation Indication) notifying switching to the Idle state to a neighboring base station.

However, in case the LTE base station is switched to the Idle state as described above, the current 3GPP Release 12 recognizes the need to continuously ensure (or guarantee) the Quality of Service (QoS) of a user equipment that is being provided with a service even after the handover, and the current 3GPP Release 12 takes this need into consideration, and accordingly, in case a base station is switched to an Idle state, the present invention also proposes a method of continuously ensuring the Quality of Service of a user equipment that is being provided with a service. This will hereinafter be described in detail in FIG. 7.

Figure 4:
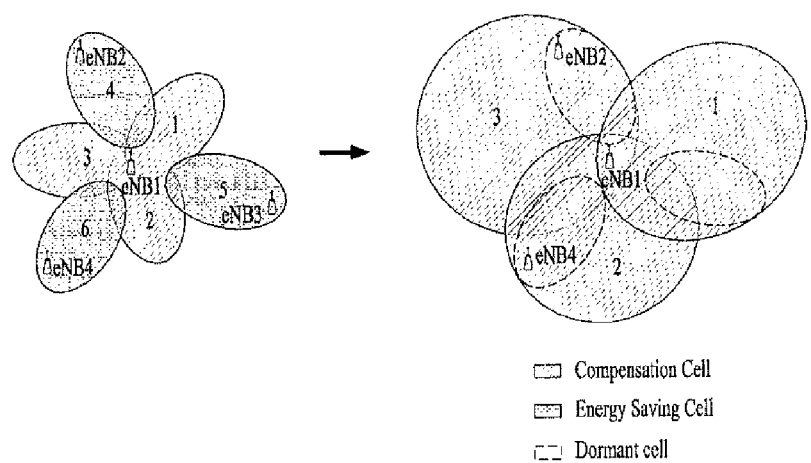
FIG. 4 illustrates an environment having a single coverage compensation base station to which the present invention can be applied.
Figure 5:
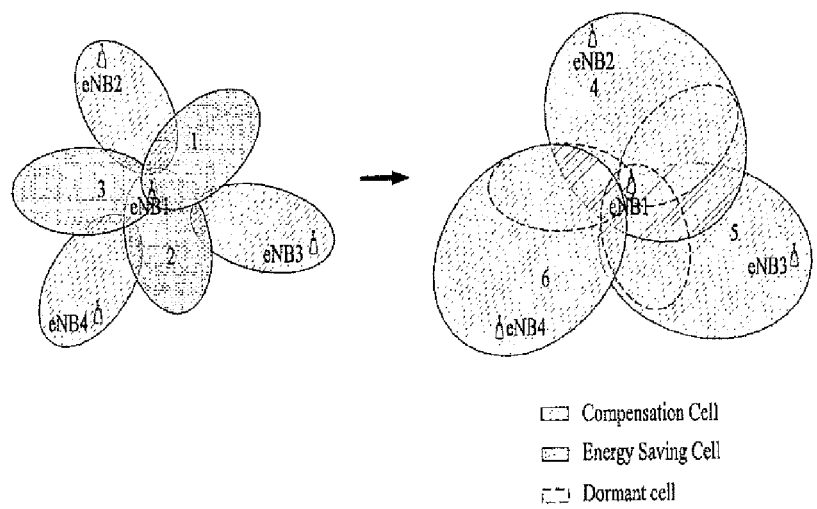
FIG. 5 illustrates an environment having multiple coverage compensation base stations to which the present invention can be applied.

FIG. 4 and FIG. 5 respectively illustrate environment having a single coverage compensation base station and multiple coverage compensation base stations to which the present invention can be applied.

A base station having almost no user equipment performing communication during an off-peak time may exist. In order to reduce energy consumption of such base station, the power of the base station may be turned (or switched) off or may be switched to an Idle state, and, in order to cover the service area of the base station that has been switched to a Power off or Idle state, a neighboring base station may extend its coverage.

Herein, the base station that is switched to a Power off or Idle state is referred to as an Energy Saving cell, an energy saving base station (energy saving eNB) or a Saving base station (Saving eNB), and a base station extending its coverage in order to cover the area that is switched to the Power Off or Idle state is referred to as a compensation cell or a compensation base station (or compensation eNB).

Based upon the distribution of the two types of base stations, two different scenarios may be divided as shown in FIG. 3 and FIG. 4. FIG. 4 corresponds to a case when Cell 1 to Cell 3 are compensation base stations and when Cell 4 to Cell 6 are Saving base stations, and FIG. 5 corresponds to a case when Cell 1 to Cell 3 are Saving base stations and when Cell 4 to Cell 6 are compensation base stations.

In relation to FIG. 4 and FIG. 5, the following Energy Saving Approach exists, and the Energy Saving Approach mentioned herein is configured of deciding which base station is the Saving base station and which base station is the Compensation base station, when an how the Saving base station is switched to the Power Off or Idle state, and how the Compensation base station will adjust its coverage accordingly, and so on.

A first method of the Energy Saving Approach is an OAM based approach (Operation and Management based approach). The OAM based approach corresponds to a scheme allowing the OAM to configure the Saving base station and the Compensation base station in advance, and deciding to switch the Saving base stations to the Power Off or Idle state based upon a proprietary algorithm.

A second method of the Energy Saving Approach is a Signaling based approach. Just as in the OAM based approach, although each of the base station types is configured in advance, this corresponds to a scheme deciding when the saving base station is switched to the Power off or Idle state and how the coverage of the compensation base station (or coverage providing base station) will be adjusted through signaling between the base stations.

A third method of the Energy Saving Approach is a Hybrid OAM and Signaling based approach. Just as in the two schemes described above, the Hybrid OAM and Signaling based approach is identical in that the OAM configures each of the base station types in advance, however, this corresponds to a scheme deciding parameter values that are required for turning the power of the saving base station off or for switching the saving base station to the Idle state by having the base stations perform communication with the OAM.

Among the Energy Saving Approach methods, the present invention considers the Signaling based approach, and, among the two scenarios shown in FIG. 4 and FIG. 5, the present invention most particularly considers the environment having multiple coverage base stations, which is shown in FIG. 5.

In the Signaling based approach, the saving base station verifies its Cell load information, and, in case the Cell load is maintained at a predetermined threshold value or below for a predetermined period of time, the saving base station may decide to turn its power off or to shift to an Idle or Dormant state.

Additionally, such decision of the saving base station may, at the same time, trigger the performance of communication with the compensation base station and may transmit a coverage compensation request to the compensation base station (compensation cell) in the form of a request message.

Information relates to the coverage of the saving base station transmitting the request message may be included in such request message.

Meanwhile, the compensation base station that has received the request message may decide whether or not compensation of the coverage of the saving base station, which has transmitted the request message, is possible, or, based upon this information, the compensation base station may decide whether or not turning off the power of the saving base station or shifting the saving base station to an Idle or Dormant state is possible, and, then, the compensation base station may feedback the decided result.

If the power of the saving base station is turned off, or if the saving base station is shifted to the Idle or dormant state, the compensation base station may compensate for the coverage area that was serviced by the saving base station. Accordingly, the saving base station performs handover of the user equipments, which were provided with services from the saving base station, to the compensation base station, so as to allow the user equipments to be continuously provided with services from the compensation base station, and, then, the saving base station turns its power off or shifts to an Idle or dormant state.

However, since the handover is an operation for providing mobility and is not an operation compensating for the Quality of Service Requirement, in the above-described case, a problem of not being capable of ensuring the quality of service of the user equipment(s) may occur.

Additionally, although the handover may ensure (or guarantee) the quality of service respective to a GBR Bearer (Guaranteed Bit Rate Bearer), which is requested by a saving base station corresponding to a source base station, the handover may not ensure (or guarantee) the quality of service respective to a non-GBR Bearer (non-Guaranteed Bit Rate Bearer). Therefore, when the saving base station performs handover of the user equipments in order to turn off the power of the saving base station or to shift the saving base station to the Idle or dormant state, a problem may occur in that the user equipment(s) may experience degradation in the quality of service or that some of the services may be interrupted (or stopped).

Therefore, in the situation shown in FIG. 4 and FIG. 5, even if the power of the saving base station is turned off or the saving base station is shifted to the Idle or dormant state, since the user equipments, which are provided with services from the saving base station, should be stably provided with services, hereinafter, according to the exemplary embodiment of the present invention, a method by which a saving base station transmits a coverage compensation request signal to determine switching to a dormant state (Idle state and a method allowing a user equipment to stably be provided with a service even if the saving base station is switched to the idle state will be described in detail.

Figure 6:
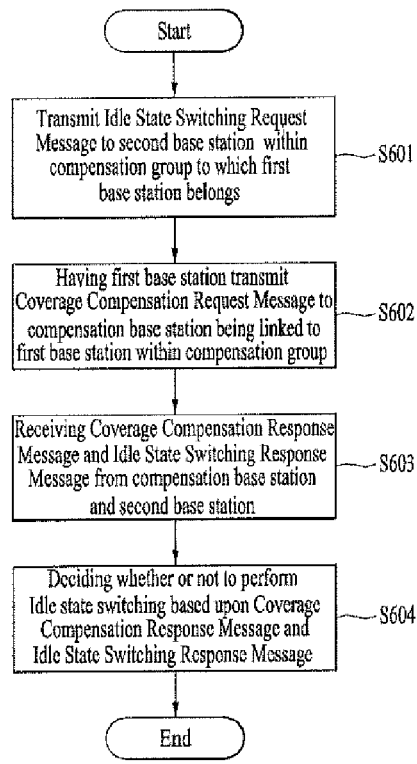
FIG. 6 illustrates a flow chart describing a method of transmitting a Coverage Compensation Request Message for allowing the base station to decide switching to an idle state according to an exemplary embodiment of the present invention.

FIG. 6 illustrates a flow chart describing a method of transmitting a Coverage Compensation Request Message for allowing the base station to decide switching to an idle state according to an exemplary embodiment of the present invention.

Referring to FIG. 6, as shown in FIG. 4 and FIG. 5, in case a single coverage compensation base station exists, or in case multiple coverage compensation base stations exist, in order to resolve the problem of not being capable of performing proper coverage compensation due to the absence of separate signaling with the compensation base station(s), when the saving base station performs Switching OFF or performs switching to the Idle State, a method by which a base station transmits a coverage compensation request signal to determine switching to a dormant state (Idle state) is proposed herein.

In FIG. 6, it will be provided that a first base station signifies a saving base station that wishes to be shifted to the Idle state, and that a second base station represents another saving base station included in the same compensation group as the first base station.

Herein, a compensation group refers to a preconfigured group, which is configured by including one or more saving base stations that can be shifted to the idle state, and one or more compensation base stations that can compensate for the coverage of the respective saving base station(s), and, for the coverage compensation, each of the one or more compensation base stations may be pre-linked to one or more saving base stations within the compensation group. More specifically, in case one or more compensation base stations are linked to one or more saving base stations, and in case the one or more saving base stations are switched to the idle state or perform Switching OFF, the one or more compensation base stations refer to base stations that can compensate for the coverage of the one or more saving base stations.

Referring back to FIG. 6, the first base station may transmit an Idle State Switching Request Message to the second base station within the compensation group to which it belongs. (S601)

The Idle State Switching Request Message corresponds to a message triggering other saving base stations within the compensation group, to which the first base station belongs, to be switched to the idle state, and the Idle State Switching Request Message may include information indicating the other saving base stations to transmit a Coverage Compensation Request Message to each of the compensation base stations respectively linked with the other saving base stations.

Meanwhile, the first base station may transmit a Coverage Compensation Request Message to the compensation base station linked to the first base station within the compensation group, to which the first base station belongs. (S602)

The Coverage Compensation Request Message corresponds to a message asking for a verification (or acknowledge) request on whether or not the compensation base station, which is linked to the first base station, can perform coverage compensation of the first base station, when the Switching OFF or switching to the Idle state of the first base station is performed.

Additionally, the Coverage Compensation Request Message may include Load information of the first base station, Coverage information of the first base station, information on the user equipments) existing in the service area of the saving base station, and information notifying that the switching to the Idle state of the first base station is possible.

The above-described Idle State Switching Request Message and the Coverage Compensation Request Message may be transmitted in a case when the Cell Load of the first base station is maintained at a predetermined threshold value or below for a predetermined period of time. Additionally, the Idle State Switching Request Message and the Coverage Compensation Request Message may be transmitted through a X2 interface, which is configured between the first base station and the second base station or the compensation base station.

Herein, the X2 interface refers to an interface through which communication is realized between base stations in an E-UTRAN (Evolved UMTS Terrestrial Radio Access Network) of a LTE system, which is configured of user equipments and base stations.

Meanwhile, although it is not shown in FIG. 6, after the first base station has transmitted the Idle State Switching Request Message or the Coverage Compensation Request Message, there may be a case when the Cell Load of the first base station exceeds the predetermined threshold value.

In this case, the first base station may transmit an Idle state switching request withdrawal message and a coverage compensation request withdrawal message to the second base station and the compensation base station notifying the second base station and the compensation base station that the first base station will not be switched to the Idle state, and the second base station and the compensation base station that have received such messages may not carry out the Idle state switching procedure and the coverage compensation procedure.

At this point, for each of the Idle State Switching Request Message and the Coverage Compensation Request Message of steps S601 to S602, the Idle state switching request withdrawal message and the coverage compensation request withdrawal message may be respectively transmitted to the same message type, and the status of each message may be differentiated by values of 0 or 1.

Referring back to FIG. 6, as a response to the Idle State Switching Request Message transmitted to the second base station in step S601, the first base station may receive a Idle State Switching Response Message from the second base station, and, as a response to the Coverage Compensation Request Message transmitted to the compensation base station in step S602, the first base station may receive a Coverage Compensation Response Message from the compensation base station. (S603)

The Idle State Switching Response Message may include information of the presence or absence of coverage compensation received from the compensation base station, which is linked to the second base station, within the compensation group to which the second base station belongs.

More specifically, although it is not shown in FIG. 6, the second base station, which has received the Idle State Switching Request Message from the first base station in step S601, may transmit a Coverage Compensation Request Message to the compensation base station, which is linked to the second base station, within the compensation group to which the second base station belongs. Additionally, as a response to the Coverage Compensation Request Message, the second base station may receive a Coverage Compensation Response Message, and the information included herein, i.e., information on whether or not the compensation base station that is linked to the second base station can compensate for the coverage of the second base station may be included in the Idle State Switching Response Message.

Additionally, the Coverage Compensation Response Message may include a result of deciding whether or not coverage compensation of the first base station can be carried out, and the result of deciding whether or not coverage compensation of the first base station can be carried out may be decided based upon whether or not the coverage of the compensation base station, which is linked to the first base station within the compensation group, can compensate for the coverage of the first base station.

In step S603, after receiving the Idle State Switching Response Message and the Coverage Compensation Response Message from the second base station and the compensation base station, the first base station may decide whether or not to switch the first base station and the second base station to the Idle state base upon the received Idle State Switching Response Message and Coverage Compensation Response Message. (S604)

More specifically, when considering the information included in the Idle State Switching Response Message and the Coverage Compensation Response Message, in case the compensation base stations respectively linked to the first base station and the second base station within the compensation group can compensate for the coverage of the first base station and the second base station, the first base station may decide the switching to the idle state of the first base station and the second base station.

Additionally, the first base station may transmit an Idle State Switching Indication Message, which indicates the switching to the Idle state, to the second base station within the compensation group, to which the first base station belongs, based upon the decision of whether or not to switch to the Idle state.

More specifically, the first base station may be considered as a base station that is capable of triggering idle state switching respective to the one or more saving base stations including the second base station within the compensation group, deciding to perform the idle state switching, and indicating the idle state switching.

Meanwhile, in case the first base station decides the idle state switching of the first base station and the second base station, although it is not disclosed in FIG. 6, the first base station performs handover of the one or more user equipments existing in the service area of the first base station to the compensation base station, which is linked to the first base station, and, then, the first base station may be capable of performing Switching OFF or switching to the idle state.

Additionally, the second base station, which has received the Idle State Switching Indication Message from the first base station, and which has then been notified of the decision to perform the idle state switching, may also perform the same handover procedure as the first base station and may, then, perform Switching OFF or switching to the idle state.

Figure 7:
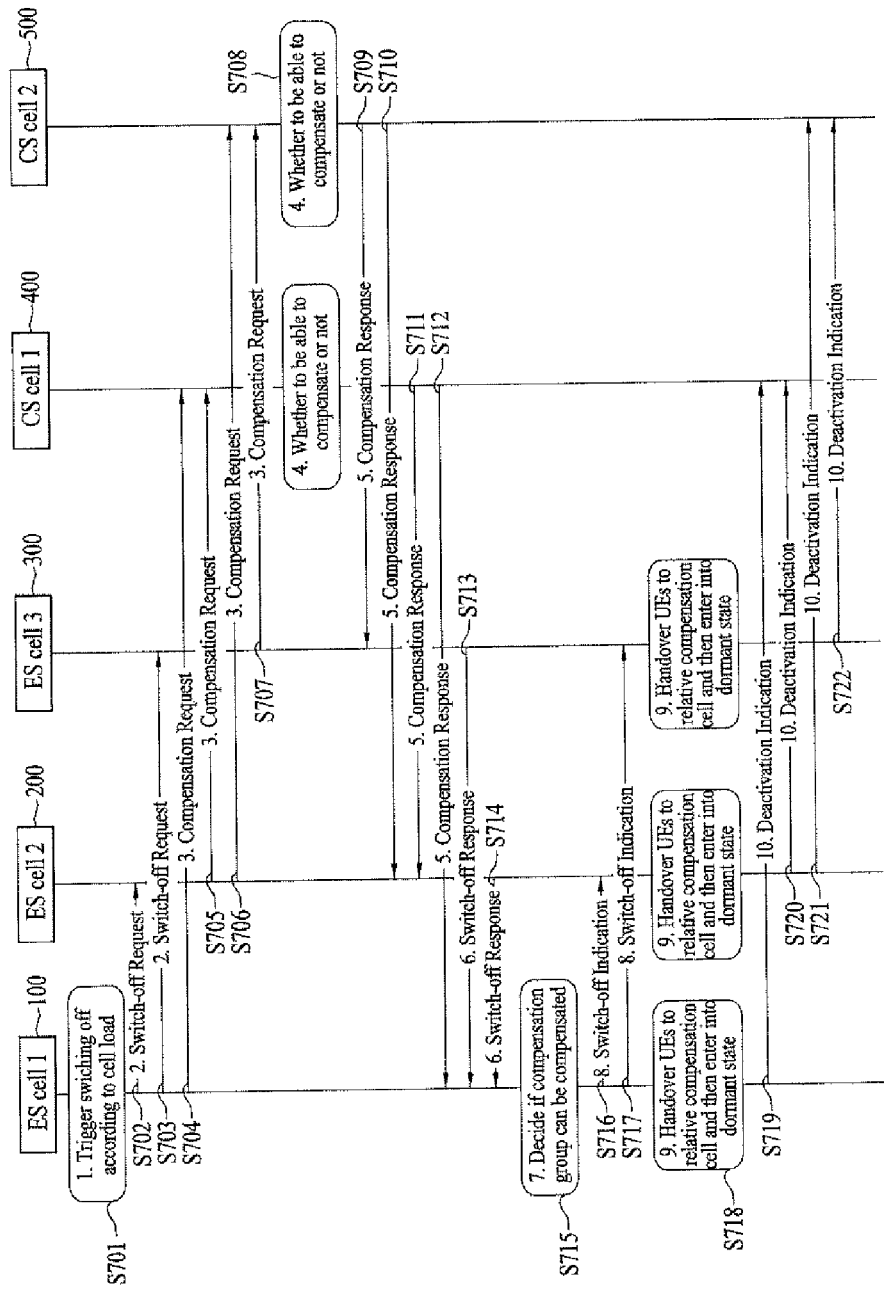
FIG. 7 illustrates an exemplary method of transmitting a Coverage Compensation Request Message for allowing the base station to decide switching to an idle state according to an exemplary embodiment of the present invention.

FIG. 7 illustrates an exemplary method of transmitting a Coverage Compensation Request Message for allowing the base station to decide switching to an idle state according to an exemplary embodiment of the present invention.

Referring to FIG. 7, the wireless communication system may be configured by including a Saving base station 1 (100), a Saving base station 2 (200), a Saving base station 3 (300), a Compensation base station 1 (400), and a Compensation base station 2 (500).

Herein, it will be provided that the Saving base stations 1 to 3 (100 to 300) and the Compensation base stations 1 to 2 (400 to 500) correspond to base stations belonging to one predetermined compensation group, and, in case the Saving base stations 1 to 3 (100 to 300) perform Switching OFF or switching to the idle state, it will be provided that the Compensation base station 1 (400) is linked to the Saving base stations 1 and 2 (100, 200) and that the Compensation base station 2 (500) is linked to the Saving base stations 2 and 3 (200, 300), and it will also be provided that the compensation base station compensates for the coverage of its linked saving base station.

Herein, a compensation group refers to a predetermined group, which is configured by including one or more Saving base stations that can be switched to the idle state and one or more compensation base stations that can compensate for the coverage of the saving base station, and each of the one or more compensation base stations may be respectively pre-linked to the one or more saving base stations within the compensation group in order to perform coverage compensation. More specifically, in case one or more compensation base stations are linked to one or more saving base stations, and in case the one or more saving base stations switch to the idle state or perform Switching OFF, the one or more compensation base stations signify base stations that can compensate for the coverage of the one or more saving base stations.

Referring back to FIG. 7, in case the Cell Load of the Saving base station 1 (100) is maintained to a predetermined threshold value or below for a predetermined period of time, the Saving base station 1 (100) may perform Triggering of the Switching OFF or the switching to the idle state. (S701)

Additionally, in this case, the Saving base station 1 (100) may transmit an Idle State Switching Request Message to the Saving base stations 2 and 3 (200, 300), which correspond to the other saving base stations within the compensation group to which the Saving base station 1 (100) belongs. (S702 to S703)

The Idle State Switching Request Message is a message that performs Triggering of the switching to the idle state to the other saving base stations (200, 300) within the compensation group to which the Saving base station 1 (100) belongs, and the Idle State Switching Request Message may also include information indicating the other saving base stations (200, 300) to transmit a Coverage Compensation Request Message to each of the compensation base stations (400, 500), which are respectively linked to the other saving base stations.

Meanwhile, the Saving base station 1 (100) may transmit a Coverage Compensation Request Message to the compensation base station (400) that is linked to the first base station within the compensation group to which the first base station belongs. (S704)

Additionally, after receiving the Idle State Switching Request Message from the Saving base station 1 (100), in steps S702 to S703, the Saving base stations 2 and 3 (200, 300) may transmit a Coverage Compensation Request Message to the compensation base stations (400, 500), which are respectively linked to the saving base stations, within the compensation group to which the saving base stations belong. (S705 to S707)

Herein, as described above, since the Saving base station 2 (200) is linked to both the Compensation base station 1 (400) and the Compensation base station 2 (500) within the compensation group, as shown in steps S705 to S706, the Saving base station 2 (200) may transmit a Coverage Compensation Request Message to both the Compensation base station 1 (400) and the Compensation base station 2 (500), which are linked to the Saving base station 2 (200).

The Coverage Compensation Request Message corresponds to a message asking for a verification request on whether or not the compensation base station, which is linked to the saving base station, can perform coverage compensation of the saving base station, when the Switching OFF or switching to the Idle state of the saving base station is performed.

Additionally, the Coverage Compensation Request Message may include Load information of the saving base station, Coverage information of the saving base station, information on the user equipment(s) existing in the service area of the saving base station, and information notifying that the switching to the Idle state of the saving base station is possible.

Meanwhile, after receiving the Coverage Compensation Request Message according to steps S704 to S707, each of the Compensation base stations 1 and 2 (400, 500) determines whether or not it can compensate for the coverage of the saving base stations that are respectively linked to each of the compensation base stations. (S708)

More specifically, the Compensation base station 1 (400) decides whether or not it can compensate for the Saving base stations 1 and 2 (100, 200), which are linked to the Compensation base station 1 (400), and the Compensation base station 2 (500) determines whether or not it can compensate for the Saving base stations 2 and 3 (200, 300), which are linked to the Compensation base station 2 (500).

Thereafter, each of the Compensation base stations 1 and 2 (400, 500) may respectively transmit a Coverage Compensation Response Message to each of the saving base stations linked to the compensation base stations, i.e., each of the saving base stations that has transmitted the Coverage Compensation Request Message to the respective compensation base stations, and the Coverage Compensation Response Message may include may include a result of deciding whether or not coverage compensation of the saving base station can be carried out. And, the result of deciding whether or not coverage compensation can be carried out may be decided based upon whether or not each of the Compensation base stations 1 and 2 (400, 500) can compensate for the coverage of the saving base stations, which are linked to the respective compensation base station, as determined above. (S709 to S712)

More specifically, the Compensation base station 1 (400) may transmit a Coverage Compensation Response Message to the Saving base stations 1 and 2 (100, 200), which are linked to the Compensation base station 1 (400), and the Compensation base station 2 (500) may transmit a Coverage Compensation Response Message to the Saving base stations 2 and 3 (200, 300), which are linked to the Compensation base station 2 (500).

Meanwhile, after receiving the Coverage Compensation Response Message from the Compensation base stations 1 and 2 (400, 500), the Saving base stations 2 and 3 (200, 300) may transmit an Idle State Switching Response Message to the Saving base station 1 (100), as a response to the Idle State Switching Request Message received from the Saving base station 1 (100) in steps S702 to S703. (S713, S714)

Additionally, the Idle State Switching Response Message may include information included in the Coverage Compensation Response Message received in steps S709 to S711, i.e., information on whether or not the Compensation base stations 1 and 2 (400, 500), which are linked to each of the Saving base stations 2 and 3 (200, 300), can compensate for the coverage of the Saving base stations 2 and 3 (200, 300).

Meanwhile, the Saving base station 1 (100), which has received the Idle State Switching Response Message and the Coverage Compensation Response Message from the Saving base stations 2 and 3 (200, 300) and the Compensation base stations 1 and 2 (400, 500) in steps S712 to S714, may decide whether or not to switch the Saving base stations 1 to 3 (100 to 300) to the Idle state based upon the received Idle State Switching Response Message and Coverage Compensation Response Message. (S715)

More specifically, when considering the information included in the received Idle State Switching Response Message and Coverage Compensation Response Message, in case the compensation base stations (400, 500), which are linked to each of the Saving base stations 1 to 3 (100 to 300) within the compensation group, can compensate for the coverage of the Saving base stations 1 to 3 (100 to 300), the Saving base station 1 (100) may decide to perform Idle state switching of the Saving base stations 1 to 3 (100 to 300).

More specifically, the Saving base station 1 (100) may be considered as a base station that is capable of triggering idle state switching respective to the one or more saving base stations including the Saving base stations 2 and 3 (200, 300) within the compensation group, deciding to perform the idle state switching, and indicating the idle state switching.

Meanwhile, in case the Saving base station 1 (100) decides to perform Idle state switching of the Saving base station 1 to 3 (100 to 300), the Saving base station 1 (100) may transmit a Switching OFF indication or an Idle State Switching Indication Message to each of the Saving base stations 2 and 3 (200, 300). (S716 to S717)

However, although it is not shown in FIG. 7, if the Saving base station 1 (100) determines that the Idle state switching of the Saving base stations 1 to 3 (100 to 300) is not possible, the Saving base station 1 (100) may transmit a message indicating that the Switching OFF or the Idle state switching cannot be performed to each of the Saving base stations 2 and 3 (200, 300), or the Saving base station 1 (100) may not transmit any message at all.

In step S718, each of the saving base stations (100 to 300) within the compensation group may carry out a procedure of performing handover of one or more user equipments within its service area to the Compensation base station 1 or 2 (400, 500), which is linked to the respective saving base station. (S718)

The procedure of performing handover will be described in more detail later or with reference to FIG. 8.

Referring back to FIG. 7, after completing the procedure of performing handover of the one or more user equipments within its service area to the Compensation base station 1 or 2 (400, 500), which is linked to the respective saving base station, each of the saving base stations (100 to 300) within the compensation group may transmit a Deactivation indication or message to the compensation base stations (400, 500) excluding the saving base stations within the compensation group, to which each of the saving base stations (100 to 300) belongs, and to its neighboring cells, and, thereafter, each of the saving base stations (100 to 300) may perform switching to a Switching OFF state or switching to the Idle state. (S719 to S722)

Figure 8:
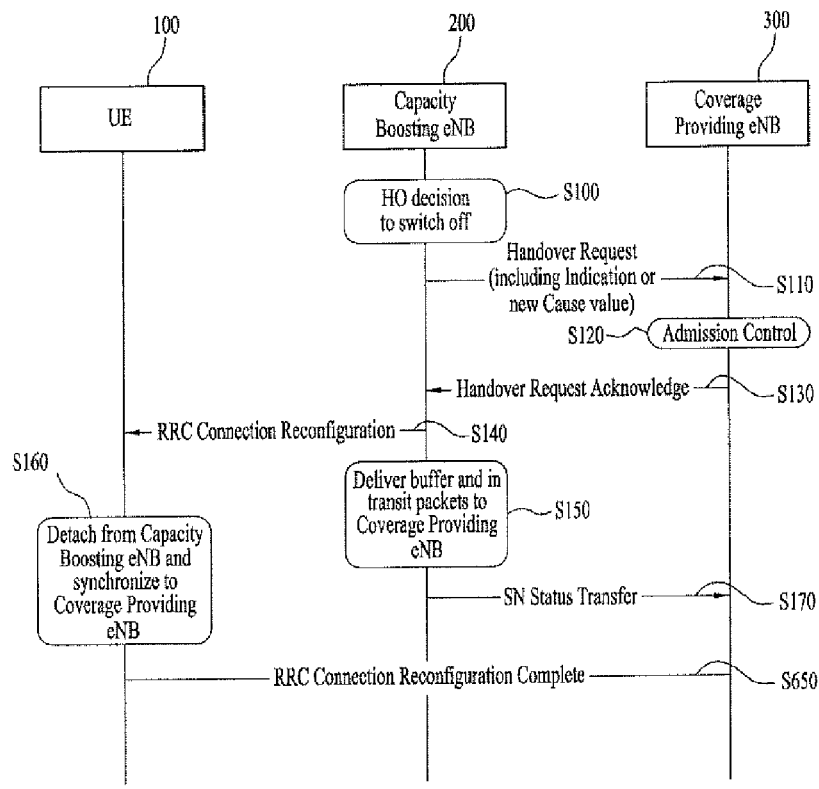
FIG. 8 illustrates an exemplary method of having a base station that wishes to be switched to an idle state perform handover of a user equipment to a compensation base station.

FIG. 8 illustrates an exemplary method of having a base station that wishes to be switched to an idle state perform handover of a user equipment to a compensation base station.

Referring to FIG. 8, the wireless communication system may be configured by including a Capacity Boosting base station (Capacity Boosting eNB, 200), which corresponds to a saving base station that wishes to be switched to the Idle state, a user equipment (UE, 100) within the service area of the Capacity Boosting eNB, and a Coverage Providing base station (Coverage Providing eNB, 300) (or compensation base station) that can compensate for the coverage of the Capacity Boosting eNB.

Herein, it will be provided that the Capacity Boosting eNB (200) and the Coverage Providing eNB (300) correspond to base stations belonging to one predetermined compensation group, and it will be provided that the Coverage Providing eNB (300) is linked to the Capacity Boosting eNB (200), and it will also be provided that the Coverage Providing eNB (or compensation base station) compensates for the coverage of its linked saving base station.

As described above in step S718 of FIG. 7, in case the saving base station within the compensation group wishes to switch to the Idle state, the saving base station may carry out a procedure of performing handover of one or more user equipment within its service area to a compensation base station that is linked to the saving base station.

In step S100, in case the Cell Load of the Capacity Boosting eNB is maintained at a predetermined threshold value or below during a predetermined period of time, the Capacity Boosting eNB (200), which corresponds to a saving base station, the Capacity Boosting eNB (200) may decide to perform handover of the user equipment (100) within its service area to the Coverage Providing eNB (300) before deciding to perform Switching OFF or to be switched to the Idle state and performing Switching OFF or being switched to the Idle state. (S100)

At this point, the Capacity Boosting eNB (200) may transmit a Handover Request Message to the Coverage Providing eNB (300), and the Handover Request Message may include information requesting the user equipment (100) within the service area of the Capacity Boosting eNB to be handed over to the Coverage Providing eNB (300), and the Handover Request Message may also include a Quality of Service guarantee request Indication or Cause value requesting the Coverage Providing eNB (300) to identically guarantee (or ensure) the Quality of Service (QoS) provided to the user equipment (100) from the Capacity Boosting eNB (200). (S110)

More specifically, the Quality of Service guarantee request Indication or Cause value may further include information requesting the Coverage Providing eNB (300) to continue to maintain or provide usage of a specific Bearer, which is used by the user equipment (100).

Meanwhile, the Handover Request Message may be transmitted through a X2 interface, which is configured between the Capacity Boosting eNB (200) and the Coverage Providing eNB (300).

Herein, the X2 interface refers to an interface through which communication is realized between base stations in an E-UTRAN (Evolved UMTS Terrestrial Radio Access Network) of a LTE system, which is configured of user equipments and base stations.

Referring back to FIG. 8, in step S120, the Coverage Providing eNB (300) determines whether or not it can support all of the specific Bearers that are being used by the user equipment (100) based upon the Quality of Service guarantee request Indication or Cause value, which is received in step S110. (S120)

As the determined result, in case the Coverage Providing eNB (300) can support all of the specific Bearers that are being used by the user equipment (100), the Coverage Providing eNB (300) may transmit a Handover Request Acknowledge Message or a Handover Response Message to the Capacity Boosting eNB (200). (S130)

Additionally, although it is not shown in FIG. 8, as the determined result, in case the Coverage Providing eNB (300) cannot support all of the specific Bearers that are being used by the user equipment (100), the Coverage Providing eNB (300) may transmit a Handover Preparation Failure Message to the Capacity Boosting eNB (200). In this case, the Capacity Boosting eNB (200), which has received the Handover Preparation Failure Message, stops the Handover procedure and also stops the procedure of Switching OFF or switching to the Idle state.

In case the Capacity Boosting eNB (200) receives the Handover Request Acknowledge Message or the Handover Response Message from the Coverage Providing eNB (300), the Capacity Boosting eNB (200) carries out a procedure of performing handover of the user equipment (100) existing within its service area to the Coverage Providing eNB (300).

More specifically, in order to carry out the procedure for performing handover of the user equipment (100) existing within its service area to the Coverage Providing eNB (300), the Capacity Boosting eNB (200) may transmit a Radio Resource Control Connection Reconfiguration Message to the user equipment (100), and the Capacity Boosting eNB (200) may transmit information related to the user equipment (100) to the Coverage Providing eNB (300). (S140, S150, S170)

Meanwhile, the user equipment (100), which has received the Radio Resource Control Connection Reconfiguration Message from the Capacity Boosting eNB (200), may Detach the Radio Resource Control Connection with the Capacity Boosting eNB (200) and may carry out a connection with the Coverage Providing eNB (300), and, then, the user equipment (100) may transmit a Radio Resource Control Connection Reconfiguration Complete Message to the Coverage Providing eNB (300). (S160, S650)

Figure 9:
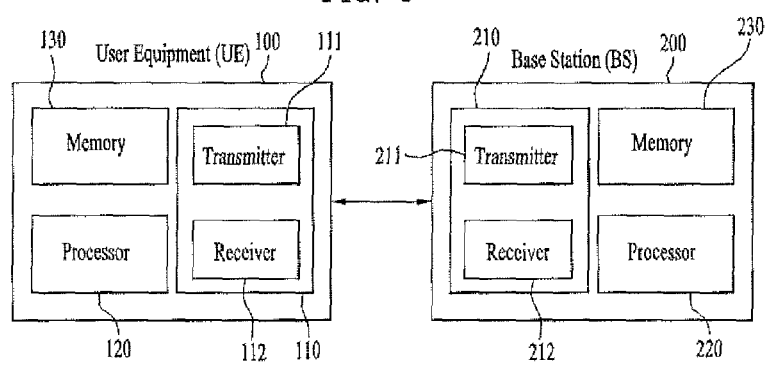
FIG. 9 illustrates a block view showing a structure of a device transmitting a coverage compensation request signal for deciding switching to an idle state according to an exemplary embodiment of the present invention.

FIG. 9 illustrates a block view showing a structure of a device transmitting a coverage compensation request signal for deciding switching to an idle state according to an exemplary embodiment of the present invention.

Although a 1:1 communication environment between a user equipment (100) and a base station is shown in FIG. 9, a communication environment between multiple user equipments and base stations may also be established, and a communication between a user equipment and a user equipment and between a base station and a base station may also be established.

Referring to FIG. 9, a wireless communication system to which the present invention can be applied may be configured by including a user equipment (100) and a base station (200), and the base station (200) may include a Radio Frequency unit (210) including a transmitter (211) and a receiver (212), a processor (220), and a memory (230).

The overall process of communication, such as signal processing, layer processing, and so on, of the base station (200) is controlled by the processor (220) and the memory (230). Additionally, a connection relationship may be configured between the RF unit (210), the processor (220), and the memory (230).

The RF unit (210) included in the base station (200) may include a transmitter (211) and a receiver (212). The transmitter (211) and the receiver (212) may be configured to transmit and receive signals from the user equipment (100) or other base stations.

The processor (220) may be configured to be functionally connected to the transmitter (211) and the receiver (212) within the RF unit, thereby allowing the transmitter (211) and the receiver (212) to control the process of transmitting/receiving signals to/from the user equipment (100) and other base stations. Additionally, after carrying out diverse processing procedures on the signal that is to be transmitted, the processor (220) may transmit the signal to the transmitter (211), and the processor (220) may also perform processing of the signal received by the receiver (212).

When required, the processor (220) may also store information included in the exchanged messages in the memory (230). By having the above-described structure, the base station (200) may perform diverse methods of carrying out the present invention, which are described above.

A RF unit (110) including a transmitter (111) and receiver (112) of the user equipment (100) is configured to transmit and receive signals to and from the base station (200). Additionally, the processor (120) of the user equipment (100) may be configured to be functionally connected to the transmitter (111) and the receiver (112), thereby allowing the transmitter (111) and the receiver (112) to control the process of transmitting/receiving signals to/from other devices including the base station (200).

Additionally, after carrying out diverse processing procedures on the signal that is to be transmitted, the processor (120) may transmit the signal to the transmitter (111), and the processor (120) may also perform processing of the signal received by the receiver (112).

When required, the processor (120) may also store information included in the exchanged messages in the memory (130).

The processors (120, 220) of the user equipment (100) and the base station (200) may direct the operations (e.g., control, adjustment, management, and so on) of each of the user equipment (100) and the base station (200). Each of the processors (120, 220) may also be connected to the respective memory (130, 230), which is capable of storing program codes and data. Each memory (130, 230) may be connected to the respective processor (120, 220), thereby being capable of storing operating systems, applications, and general files.

The processor (120, 220) of the present invention may also be referred to as a controller, a microcontroller, a microprocessor, a microcomputer, and so on. Meanwhile, the processor (120, 220) may be implemented in the form of hardware or firmware, or software, or in a combination of hardware or firmware, and software.

In case of implementing the embodiments of the present invention in the form of firmware or software, the exemplary embodiment of the present invention may be realized in the form of a module, procedure, or function, which performs the above-described functions or operations. A software code may be stored in the memory (130, 230) and then operated by the processor (120, 220). The memory may be located inside or outside of the user equipment (100) and the base station (200), and the memory may transmit and receive data to and from the processor (120, 200) by using diverse means, which have already been disclosed.

In case of implementing the embodiments of the present invention in the form of hardware, the processor (120, 220) may be equipped with ASICs (application specific integrated circuits) or DSPs (digital signal processors), DSPDs (digital signal processing devices), PLDs (programmable logic devices), FPGAs (field programmable gate arrays), and so on, which are configured to perform the present invention.

Meanwhile, the above-described method may be written as a program that can be executed in a computer and may be realized in a universal digital computer that can execute the program by using a computer-readable medium. Additionally, a structure of the data used in the above-described method may be recorded in the computer-readable medium via diverse means. Program storage devices that may be used in order to describe a storage device including computer codes that can be executed in order to perform the diverse methods of the present invention shall not be understood as devices including temporary subjects, such as carrier waves or signals. The computer-readable medium includes storage media, such as magnetic storage media (e.g., ROM, floppy disks, hard disks, and so on), optical reading media (e.g., CD-ROM, DVD, and so on).

It will be understood by anyone having general knowledge in the technical field related to the exemplary embodiments of the present invention that the present invention may be realized in modified forms within a range that does not depart from the essential characteristics of this disclosure. Therefore, the disclosed methods should be considered in a descriptive point of view and not in a limited point of view. The scope of the present invention is disclosed in the scope of the appended claims and not in the detailed description of the present invention, and all differences lying within the range of its equivalents shall be interpreted as being included in the scope of the present invention.

INDUSTRIAL APPLICABILITY

The method by which a base station transmits a coverage compensation request signal to determine switching to a dormant state (Idle state), which corresponds to the present invention, may be applied to diverse wireless communication systems.

What is claimed is:

1. A method of transmitting, by a first base station, a coverage compensation request message, to determine switching to an idle state in a wireless communication system, the method comprising:
    transmitting, by the first base station, an idle state switching request message for requesting switching to the idle state to a second base station in a compensation group to which the first base station belongs,
    transmitting, by the first base station, a first coverage compensation request message to a first compensation base station pre-linked to the first base station in the compensation group,
    wherein the second base station transmits a second coverage compensation request message to a second compensation base station pre-linked to the second base station within the compensation group based on the idle state switching request message,
    receiving, by the first base station, a first coverage compensation response message from the first compensation base station,
    receiving, by the first base station, an idle state switching response message from the second base station,
    wherein the idle state switching response message includes information of coverage compensation in a second coverage compensation response message received by the second base station from the second compensation base station as a response to the second coverage compensation request message, and
    determining whether the first base station and the second base station in the compensation group are to switch to the idle state based on the first coverage compensation response message and the idle state switching response message,
    wherein an idle state switching indication message indicating switching to the idle state is transmitted to the second base station by the first base station based on the determination on whether or not to switch to the idle state.

2. The method of claim 1, wherein the compensation group is configured by including one or more Saving base stations capable of being switched to the idle state and one or more compensation base stations capable of compensating for a coverage of the saving base station, and
    wherein each of the one or more compensation base stations is respectively pre-linked to the one or more saving base stations within the Compensation Group in order to perform coverage compensation.

3. The method of claim 2, wherein the first base station is capable of triggering idle state switching respective to the one or more saving base stations within the compensation group, deciding to perform the idle state switching, and indicating the idle state switching.

4. The method of claim 1, wherein the first coverage compensation request message includes load information of the first base station, coverage information of the first base station, and information notifying that the first base station is capable of being switched to the idle state.

5. The method of claim 1, wherein the idle state switching request message and the first compensation request message are transmitted when load of the first base station is maintained equal to or below predetermined threshold value for a predetermined period of time.

6. The method of claim 1, wherein the first compensation response message includes a result of whether to decide the coverage compensation of the first station,
    wherein the result of whether to decide the coverage compensation of the first station is decided based upon whether or not the coverage of the compensation base station is capable of compensating for the coverage of the first base station.

7. The method of claim 1, wherein whether to perform idle state switching is determined when the compensation base stations linked to each of the first base station and the second base station within the compensation group are capable of compensating for the coverage of the first base station and the second base station.

8. The method of claim 7, wherein, in case of deciding the idle state switching, the first base station transmits a handover request message to the first compensation base station,
    wherein the handover request message requests a handover of a user equipment connected to the first base station in the coverage of the first base station to the first compensation base station, and wherein the handover request message includes a quality of service (QoS) guarantee request indication or cause value requesting the compensation base station to identically guarantee the QoS provided from the first compensation base station.

9. The method of claim 8, wherein the QoS guarantee request indication or cause value includes a request for continuing to maintain usage of a specific bearer used by the user equipment.

10. The method of claim 9, wherein the first base station stops performing the handover procedure to the first compensation base station and switching of the idle state when a handover response message including a response notifying that the usage of the specific bearer is maintained is received from the compensation base station.

11. A device transmitting a coverage compensation request message to determine switching to an idle state in a wireless communication system, the device comprises:
   a Radio Frequency (RF) unit including a transmitter and a receiver; and
   a processor which is connected to the transmitter and the receiver and supports communication of the device,
   wherein the processor:
   controls the transmitter to transmit an idle state switching request message for requesting switching to the idle state to a second base station in a compensation group to which the device belongs,
   controls the transmitter to transmit a first coverage compensation request message to a first compensation base station pre-linked to the device in the compensation group,
   wherein the second base station transmits a second coverage compensation request message to a second compensation base station pre-linked to the second base station within the compensation group based on the idle state switching request message,
   controls the receiver to receive a first coverage compensation response message from the first compensation base station,
   controls the receiver to receive an idle state switching response message from the second base station,
   wherein the idle state switching response message includes information of coverage compensation in a second coverage compensation response message received by the second base station from the second compensation base station as a response to the second coverage compensation request message, and
   determines whether the device and the second base station in the compensation group are to switch to the idle state based on the first coverage compensation response message and the idle state switching response message,
   wherein an idle state switching indication message indicating switching to the idle state is transmitted to the second base station by the first base station based on the determination on whether or not to switch to the idle state.

* * * * *